No. 714,735.  
P. PATTERSON.  
METHOD OF MAKING BUTT WELD PIPE.  
(Application filed Feb. 14, 1902.)
(No Model.)
Patented Dec. 2, 1902.
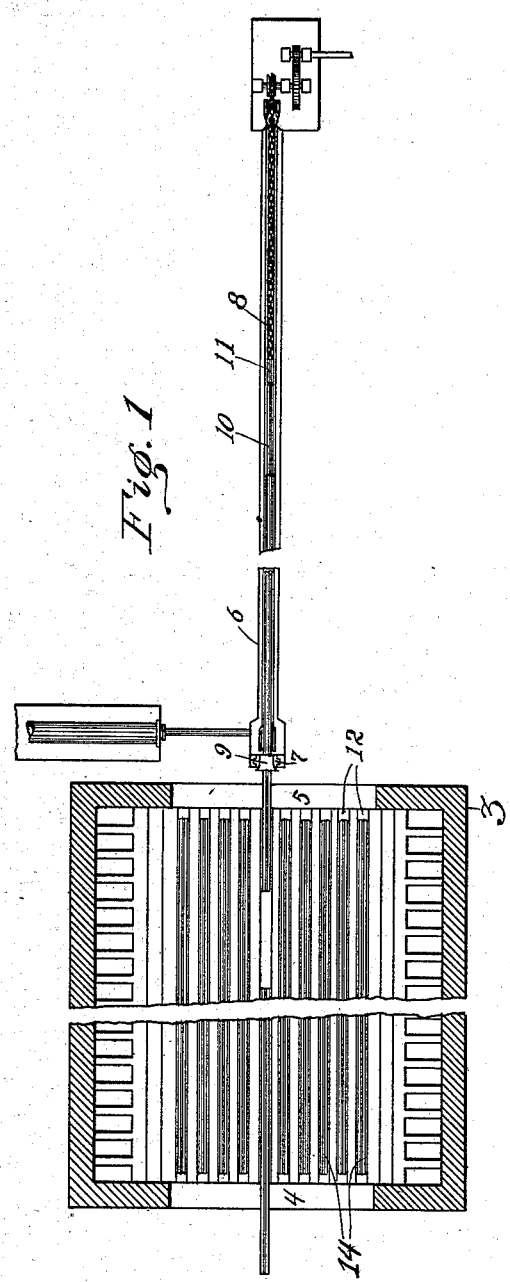
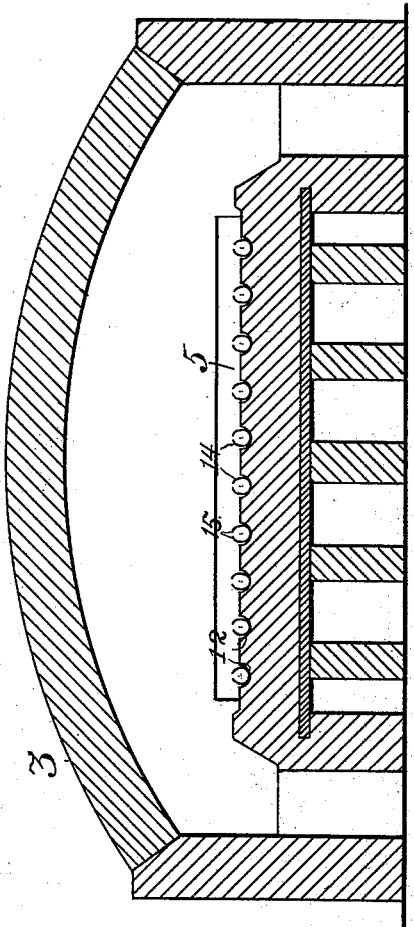
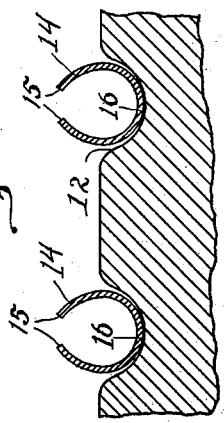
Witnesses.
Inventor.
Peter Patterson
By Kay & Totten
Attorneys

UNITED STATES PATENT OFFICE.

PETER PATTERSON, OF McKEESPORT, PENNSYLVANIA, ASSIGNOR TO NATIONAL TUBE COMPANY, OF PITTSBURG, PENNSYLVANIA, A CORPORATION OF NEW JERSEY.

METHOD OF MAKING BUTT-WELD PIPE.

SPECIFICATION forming part of Letters Patent No. 714,735, dated December 2, 1902.

Application filed February 14, 1902. Serial No. 94,119. (No model.)

*To all whom it may concern:*

Be it known that I, PETER PATTERSON, a resident of McKeesport, in the county of Allegheny and State of Pennsylvania, have invented a new and useful Improvement in Methods of Making Butt-Weld Pipe; and I do hereby declare the following to be a full, clear, and exact description thereof.

My invention relates to the manufacture of butt-weld tubing, its object being to provide a method of making the same from U-shaped or approximately tubular skelp and by which the edges of the skelps can be brought to a welding heat throughout their length, while the bodies are easily and with certainty held sufficiently stiff to force together the abutting edges into welding contact when passing through the welding-bell, and also to make possible the employment of a soft heat instead of the rash heat usually employed in the manufacture of butt-weld tubing from flat plates while heating the skelps in sufficient numbers to keep the welding mechanism in rapid operation, and so making a large output possible.

To these ends my invention consists, generally stated, in charging a U-shaped or approximately tubular skelp longitudinally through the rear end of the furnace and into a protecting-recess formed in the furnace-bed, raising the upwardly-extending edges of the skelp to a welding heat while the body rests in the recess and is thus protected from the furnace-heat, and thereafter drawing the heated skelp longitudinally through the front of the furnace and through a welding-bell, it being practicable by establishing a plurality of parallel protecting-recesses in the furnace-bed to operate concurrently upon a corresponding plurality of endwise processions of skelps, and thereby keep a large number of skelps in the furnace, as each skelp occupies but little room, and also practicable to employ a slower or softer welding heat, which will not unduly attack the upwardly-extending edges before raising them to welding heat and still provide heated skelps in sufficient number to keep the welding apparatus in practically continuous operation.

To enable others skilled in the art to practice my invention, I will describe the same more fully, referring to the accompanying drawings, in which—

Figure 1 is a horizontal section of a furnace and plan view of drawing apparatus for the practice of my invention. Fig. 2 is a cross-section of the furnace on the line 2 2, Fig. 1; and Fig. 3 is an enlarged detail view illustrating more clearly the position of the skelp on the bed.

In the practice of my invention I employ a suitable heating-furnace 3 of suitable length, having a charging-opening 4 at the rear and a withdrawing-opening 5 at the opposite end thereof. I also employ any suitable drawing apparatus 6, adapted to draw the heated skelp from different parts of the furnace-bed, that shown being the ordinary swinging drawbench, having the bell-holder 7 at its front end and the traveling draw-chain 8. Suitable welding-bells 9, tongs 10, and hooks 11 for connecting the tongs and draw-chain are also employed. The bed of the furnace is composed of sand, gravel, or other suitable material capable of withstanding a high heat, and extending longitudinally along the same are a plurality of protecting-recesses 12, corresponding to the number of skelps to be heated, the drawing showing ten of these recesses for ten processions of skelps, it being understood that the number of recesses employed will depend upon the heat of the furnace and the thickness and character of the material operated on. These protecting-recesses form predetermined longitudinal paths for the skelps through the furnace-chamber. Before commencing operations the protecting-recesses can be formed in the bed in any suitable way, after which they are maintained by the constant passage of the skelp into and out of heating position. The skelps are shown at 14 resting on the recesses 12 and in position for heating.

The plates may be bent into the desired U-shaped or approximately tubular skelps in any desired way. This may be accomplished at small cost by passing the heated plates through bending-rolls immediately after they emerge from the finishing-pass of the rolling-mill, the plates being sheared to length before bending or the skelps sheared after bending.

In the practice of the invention the furnace is preferably maintained at what is known as a "slow" or "soft" welding heat for the reasons above stated. The skelps are charged longitudinally and successively through the rear opening 4 into the protecting-recesses 12 of the furnace-bed and rest there with their edges 15 extending upwardly and their bodies 16 resting in the recesses while being heated, and the heat of the furnace raises the edges of each skelp to the desired welding heat while the the body is shielded or protected from the direct heat of the furnace by the recess in which it rests. As each skelp reaches the proper heat its front end is grasped by tongs or other suitable device and drawn longitudinally through the front of the furnace and through a welding-bell, and so welded into tubing. A fresh cold skelp can be charged into the furnace in the place of the one withdrawn, and to obtain the largest output it is preferable to charge the fresh skelp before the heated one is entirely withdrawn from the furnace. As the body 16 of the U-shaped skelp is bent to or nearly to the shape desired in the finished tube and the remaining work of the welding-bell is to bring the upwardly-extending edges 15 into abutting and welding contact, it is evident that it is only necessary to raise the body to bending-heat to enable it to conform to the shape of the bell and that the stiffer the body portion the greater will be the pressure between the contacting edges and the more perfect the weld obtained. The continual feeding of fresh cold skelps into the protecting-recess serves to chill the recess, and so aids in holding the body portion of the skelps stiffer for forcing the edges together in passing through the welding-bell. In this way of working a slower and softer heat can be employed than is employed to the best advantage in heating flat plates for welding in bells, and therefore the heating period and the critical period during which the edges are at proper welding heat can both be lengthened and the danger of producing imperfectly-welded tubes reduced. This result can be attained without reducing the output, because the U-shaped skelps occupy but little space on the furnace-bed, and a sufficient number of heated skelps can be provided for rapid welding operations. The softer heat which can be employed also extends the life of the furnace, which is very injuriously acted upon and quickly burned out by the high rash or oxidizing heat necessarily employed in ordinary practice to obtain a large output.

What I claim as my invention, and desire to secure by Letters Patent, is—

1. The method of forming butt-weld tubing consisting in charging a U-shaped or approximately tubular skelp longitudinally through the rear of the furnace and into a protecting-recess in the furnace-bed, raising the upwardly-extending edges of the skelp to welding heat while the body rests in the recess and is thus protected from the furnace-heat, and thereafter drawing the heated skelp longitudinally through the front end of the furnace and through a welding-bell.

2. The method of forming butt-weld tubing consisting in taking a U-shaped or approximately tubular skelp, heating the same while the body is somewhat protected from the heat, whereby the projecting edges of the skelp are raised to a welding heat while the body remains comparatively stiff, and thereafter drawing the heated skelp through a welding-bell.

In testimony whereof I, the said PETER PATTERSON, have hereunto set my hand.

PETER PATTERSON.

Witnesses:
F. W. WINTER,
ROBERT C. TOTTEN.